(12) United States Patent
Takahashi

(10) Patent No.: US 8,484,012 B2
(45) Date of Patent: *Jul. 9, 2013

(54) INFORMATION SERVICE APPARATUS AND METHOD, INFORMATION DISPLAY APPARATUS AND INFORMATION SERVICE SYSTEM

(75) Inventor: Seiji Takahashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 218 days.

This patent is subject to a terminal disclaimer.

(21) Appl. No.: 13/026,897

(22) Filed: Feb. 14, 2011

(65) Prior Publication Data

US 2011/0137637 A1 Jun. 9, 2011

Related U.S. Application Data

(63) Continuation of application No. 10/748,133, filed on Dec. 31, 2003, now Pat. No. 7,925,497.

(30) Foreign Application Priority Data

Jan. 7, 2003 (JP) ................................. 2003-001115

(51) Int. Cl.
*G06F 17/20* (2006.01)
(52) U.S. Cl.
USPC ............................................. 704/8; 704/270
(58) Field of Classification Search
USPC ...................................................... 704/8, 270
See application file for complete search history.

(56) References Cited

U.S. PATENT DOCUMENTS

| | | | | |
|---|---|---|---|---|
| 5,307,265 A * | 4/1994 | Winans | ............................. | 704/8 |
| 5,675,818 A * | 10/1997 | Kennedy | ........................... | 704/8 |
| 5,778,356 A * | 7/1998 | Heiny | .................................. | 1/1 |
| 5,917,484 A * | 6/1999 | Mullaney | ...................... | 715/703 |
| 6,321,191 B1 * | 11/2001 | Kurahashi | ........................ | 704/8 |
| 6,334,101 B1 * | 12/2001 | Hetherington et al. | ........... | 704/8 |
| 6,347,316 B1 * | 2/2002 | Redpath | ............................. | 1/1 |
| 6,360,196 B1 * | 3/2002 | Poznanski et al. | ................ | 704/8 |
| 6,384,922 B1 * | 5/2002 | Hayama et al. | ............... | 358/1.13 |
| 6,604,101 B1 * | 8/2003 | Chan et al. | .................... | 707/706 |
| 6,615,168 B1 * | 9/2003 | Resnik et al. | ..................... | 704/8 |
| 6,993,568 B1 * | 1/2006 | Hauduc et al. | ................ | 709/217 |
| 7,039,867 B1 * | 5/2006 | Scheidig | ....................... | 715/703 |
| 7,113,904 B2 * | 9/2006 | Litster et al. | ..................... | 704/8 |
| 7,299,452 B1 * | 11/2007 | Zhang et al. | .................. | 717/124 |
| 7,409,334 B1 * | 8/2008 | Shoemaker | ...................... | 704/8 |
| 7,412,374 B1 * | 8/2008 | Seiler et al. | ..................... | 704/8 |
| 7,418,390 B1 * | 8/2008 | Jokipii | ....................... | 704/270.1 |

(Continued)

FOREIGN PATENT DOCUMENTS

| | | |
|---|---|---|
| WO | WO 02-01386 A1 | 1/2002 |
| WO | WO 02/079964 A1 | 10/2002 |

*Primary Examiner* — Douglas Godbold
(74) *Attorney, Agent, or Firm* — Oblon, Spivak, McClelland, Maier & Neustadt, L.L.P.

(57) ABSTRACT

An information service apparatus provides information described in a language suitable for a user. The information service apparatus has an operation panel on which operation information on the information service apparatus is displayed. It is judged whether or not information can be provided in a language designated by discrimination information contained in a request from a terminal. When it is determined that the information in the language designated by the discrimination information cannot be provided, an operation panel language used for displaying the operation information on the operation panel is set as the language used for providing the information.

7 Claims, 5 Drawing Sheets

U.S. PATENT DOCUMENTS

| | | | |
|---|---|---|---|
| 7,925,497 B2 * | 4/2011 | Takahashi | 704/8 |
| 2002/0111933 A1 * | 8/2002 | Noble et al. | 707/1 |
| 2002/0116172 A1 * | 8/2002 | Vargas | 704/8 |
| 2002/0143523 A1 * | 10/2002 | Balaji et al. | 704/8 |
| 2002/0177993 A1 * | 11/2002 | Veditz et al. | 704/8 |
| 2003/0046059 A1 * | 3/2003 | Litster et al. | 704/8 |
| 2003/0140316 A1 * | 7/2003 | Lakritz | 715/536 |
| 2003/0191817 A1 * | 10/2003 | Fidler | 709/219 |
| 2004/0044518 A1 * | 3/2004 | Reed et al. | 704/8 |
| 2004/0205118 A1 * | 10/2004 | Yu | 709/203 |
| 2005/0043938 A1 * | 2/2005 | Viken et al. | 704/8 |

* cited by examiner

INFORMATION SERVICE APPARATUS AND METHOD, INFORMATION DISPLAY APPARATUS AND INFORMATION SERVICE SYSTEM

CROSS-REFERENCE TO RELATED APPLICATIONS

This application is a continuation of and is based upon and claims the benefit of priority under 35 U.S.C. §120 for U.S. Ser. No. 10/748,113, filed Dec. 31, 2003 now U.S. Pat. No. 7,925,497, and which claims the benefit of priority under 35 U.S.C. §119 from Japanese Patent Application No. 2003-001115, filed Jan. 7, 2003, the entire contents of each of which are incorporated herein by reference.

BACKGROUND OF THE INVENTION

1. Field of the Invention

The present invention generally relates to information service apparatuses and, more particularly, to an information service apparatus that provides information to a terminal connected to the information service apparatus through a network.

2. Description of the Related Art

There are image processing apparatuses that serve as information service apparatuses. Along with the popularization of Web techniques, many image processing apparatuses, such as a line printer (LP), a multi-function printer (MFP), etc., have been provided with a Web server function so as to respond to a request from a client on a network by providing information regarding a status or structure of the apparatus and setting of the network in the form of a Web page.

On the other hand, with the internationalization in recent years, users using information service apparatuses of the same model have become not always use the same language. In order to cope with such circumstances, there are many apparatuses available on the market that can provide the same information in various different languages.

A Web server, which offers the same information in various languages, judges a language which a user desires to use in accordance with a value of an Accept-Language field contained in a Uniform Resource Locater (URL) requested by a Web client or a request header of a Hyper Text Transfer Protocol (HTTP), and provides Web pages in the thus-judged language.

However, there a case where a language is not clearly designated by a Web client (for example, there in no input of designation in the Accept-Language field), or even if the designation of a language is provided, the Web server does not support the designated language. In such a case, a Web page is provided to the Web client in a predetermined language that is previously set irrespective of user's designation. That is, there are many cases where a Web page is described in English as an international common language.

However, there is a problem in that English is not always a language that can be easily understood by users of the Web server.

SUMMARY OF THE INVENTION

It is a general object of the present invention to provide an information service apparatus and method, information display apparatus and information service system, in which the above-mentioned problems are eliminated.

A more specific object of the present invention is to provide an information service apparatus and method, information display apparatus and information service system, which can provide information described in a language suitable for a user.

In order to achieve the above-mentioned objects, there is provided according to one aspect of the present invention an information service apparatus for providing information to a terminal connected through a network in accordance with a request sent from the terminal, the information service apparatus comprising: an operation panel on which operation information on the information service apparatus is displayed; language correspondence judgment means for judging whether or not the information can be provided in a language designated by discrimination information contained in the request from the terminal; and language determination means for determining the language to be used in providing the information, wherein, when the language correspondence judgment means determines that the information in the language designated by the discrimination information cannot be provided, the language determination means sets an operation panel language used for displaying the operation information on the operation panel as the language used for providing the information.

According to the above-mentioned information service apparatus, information can be provided to a user in a language suitable for the user since the information is displayed in the language used in a display on the operation panel of the information service apparatus when the information service apparatus is incapable of providing the information in the language requested by the terminal.

Additionally, the information service apparatus according to the present invention may further comprise discrimination information existence judgment means for judging whether the discrimination information is contained in the request from the terminal, wherein the language determination means may set the operation panel language as the language used for providing the information when the discrimination information existence judgment means judges that the discrimination information is not contained in the request from the terminal.

Accordingly, even when the terminal does not provided a clear designation of the language to be used, information can be provided to a user in a language suitable for the user since the information is displayed in a language that is used in a display on the operation panel of the information service apparatus and has a high possibility for a user to understand the language.

Further, in the above-mentioned information service apparatus, a plurality of languages may be supported as the operation panel language so as to use one language previously selected from among the plurality of languages when displaying the operation information on the operation panel.

Accordingly, the above-mentioned information service apparatus can provide information in a language selected from among a plurality of supported languages when it is incapable of providing the information in the language requested by the terminal or when the terminal does not provided clear designation of the language to be used.

Additionally, in the information service apparatus according to the present invention, when the language designated by the discrimination information contained in the request from the terminal corresponds to neither of the plurality of supported languages, the language correspondence judgment means may judge that the information cannot be provided in the language designated by the discrimination information.

Further, in the information service apparatus according to the present invention, the request from the terminal may be a HTTP request, and the discrimination information may be a value of an Accept-Language field included in the HTTP request. The information service apparatus may be an image processing apparatus, which processes image data.

Additionally, there is provided according to another aspect of the present invention an information display apparatus comprising: information service request means for sending a send request to an information service apparatus that provides information through a network, the send request for requesting the information and designating a language used in displaying the information; and information display means for displaying the information received from the information service apparatus, wherein, when the information service apparatus is incapable of providing the information in the language designated by the information service request means, the information display means displays the information received from the information service apparatus in a language used for displaying information on an operation panel of the information service apparatus.

According to the above-mentioned information display apparatus, information can be provided to a user in a language suitable for the user since the information is displayed in the language, which is used in a display on the operation panel of the information service apparatus and has a high possibility for the user to understand the language, when the information service apparatus is incapable of providing the information in the language requested by the terminal.

Additionally, there is provided according to another aspect of the present invention an information service system comprising: a terminal connected to a network; and an information service apparatus sending information to the terminal through the network in accordance with a request sent from the terminal, wherein the information service apparatus comprises: an operation panel on which operation information on the information service apparatus is displayed; language correspondence judgment means for judging whether or not the information can be provided in a language designated by discrimination information contained in the request from the terminal; and language determination means for determining the language to be used in providing the information, wherein, when the language correspondence judgment means determines that the information in the language designated by the discrimination information cannot be provided, the language determination means sets an operation panel language used for displaying the operation information on the operation panel as the language used for providing the information; and wherein the terminal displays the information in the language determined by the language determination means.

Further, there is provided according to another aspect of the present invention an information service method for providing information from an information service apparatus to a terminal connected to the information service apparatus through a network in accordance with a request sent from the terminal, comprising: a language correspondence judgment procedure of judging whether or not the information can be provided in a language designated by discrimination information contained in the request from the terminal; and a language determination procedure of determining the language to be used in providing the information, wherein, when the language correspondence judgment procedure determines that the information in the language designated by the discrimination information cannot be provided, the language determination procedure sets an operation panel language used for displaying the operation information on the operation panel as the language used for providing the information.

Other objects, features and advantages of the present invention will become more apparent from the following detailed description when read in conjunction with the accompanying drawings.

DETAILED DESCRIPTION OF THE PREFERRED EMBODIMENT

A description will be given below, with reference to the drawings, of an embodiment of the present invention. In this embodiment, an image processing apparatus is explained as an example of an information service apparatus.

Figure 1:
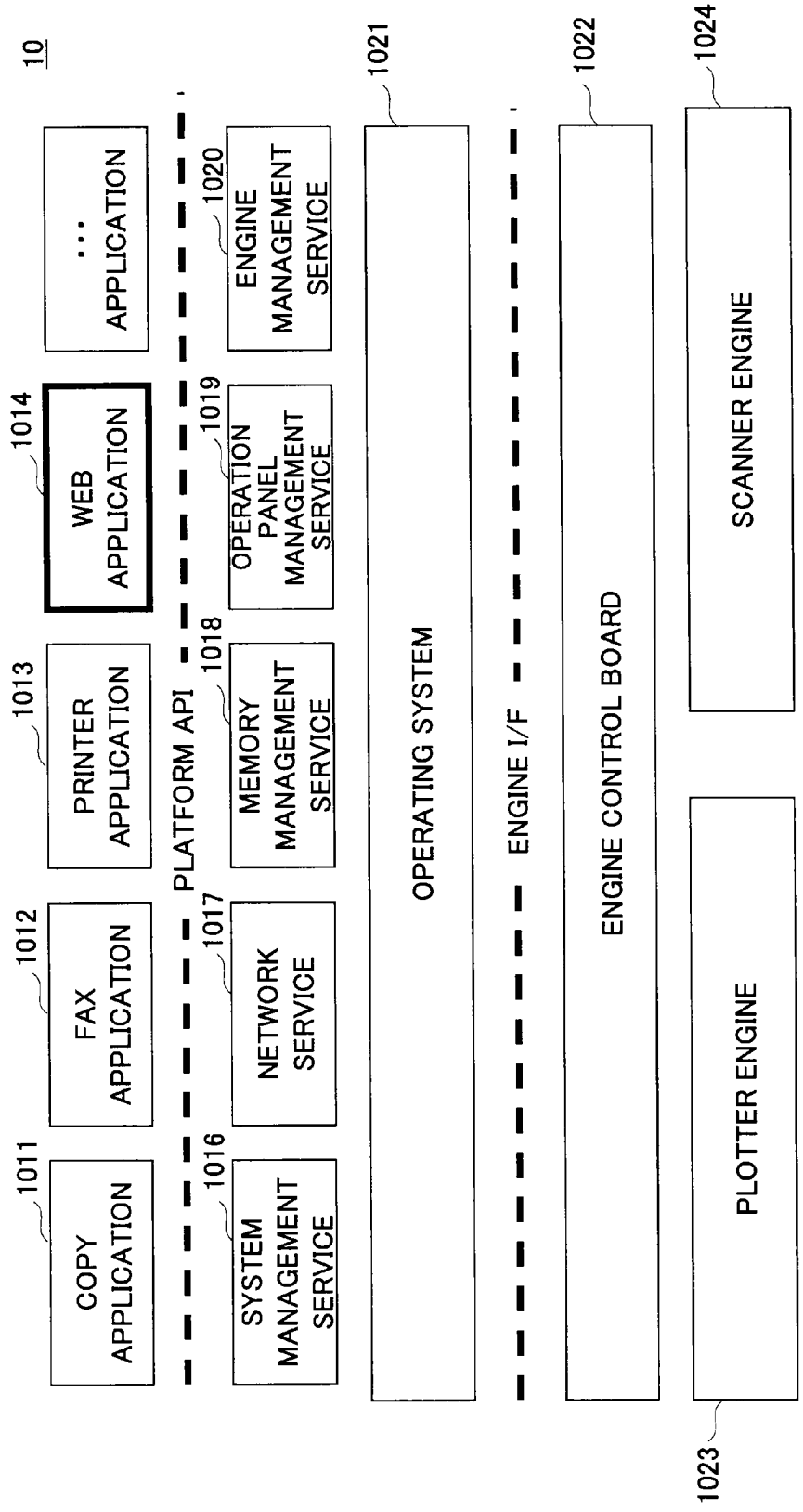
FIG. 1 is a diagram showing a functional structure of an image processing apparatus according to the present embodiment.

FIG. 1 is a diagram showing a functional structure of an image processing apparatus according to the present embodiment.

A shown in FIG. 1, the image processing apparatus according to the present embodiment comprises: hardware resources, such as a plotter engine 1023 and a scanner engine 1024, for performing image processing individually; an engine control board 1022; an operating system (OS) 1021; a system management service 1016; a network service 1017; a memory management service 1018; an operation panel management service 1019; an engine management service 1020; and various kinds of applications such as a copy application 1011, a fax application 1012, a printer application 1013, a Web application 1014, etc.

The engine control board 1022 controls each functional part of the image processing apparatus, such as the plotter engine 1023 and the scanner engine 1024, so as to provide the functions of the engine control board 1022 to the operating system 1021.

The operating system 1021 can be achieved by, for example, UNIX (trade mark), and is capable of concurrently performing various kinds of software as processes, such as the copy application 1012, the fax application 1012, etc.

The system management service 1016, the network service 1017, the memory management service 1018, the operation panel management service 1019 and the engine management service 1020 provide their functions to higher-order applications such as the copy application, etc., through an application programming interface (API). That is, the system management service 1016 provides a function regarding a system management, and the network service 1017 provides a function regarding network communications. Moreover, the memory management service 1018 provides a function regarding a memory management, and the operation panel management service 1019 provides a function regarding an operation panel provided in the image processing apparatus 10. Further, the engine management service 1020 provides a function for controlling the plotter engine 1023 and the scanner engine 1024 through the engine control board 1022.

The copy application 1011 is for achieving a copy function of the image processing apparatus 10. The fax application 1012 is for achieving a facsimile function of the image processing apparatus 10. The printer application 1013 has a page description language (PDL), a printer control language (PCL)

and a postscript (PS) so as to achieve a printer function of the image processing apparatus 10. The Web application 1014, which provides a function relating to the present invention, provides various kinds of information in a language suitable for a remote user to terminals connected to the image processing apparatus through the network in a language suitable for the users of the terminals.

Figure 2:
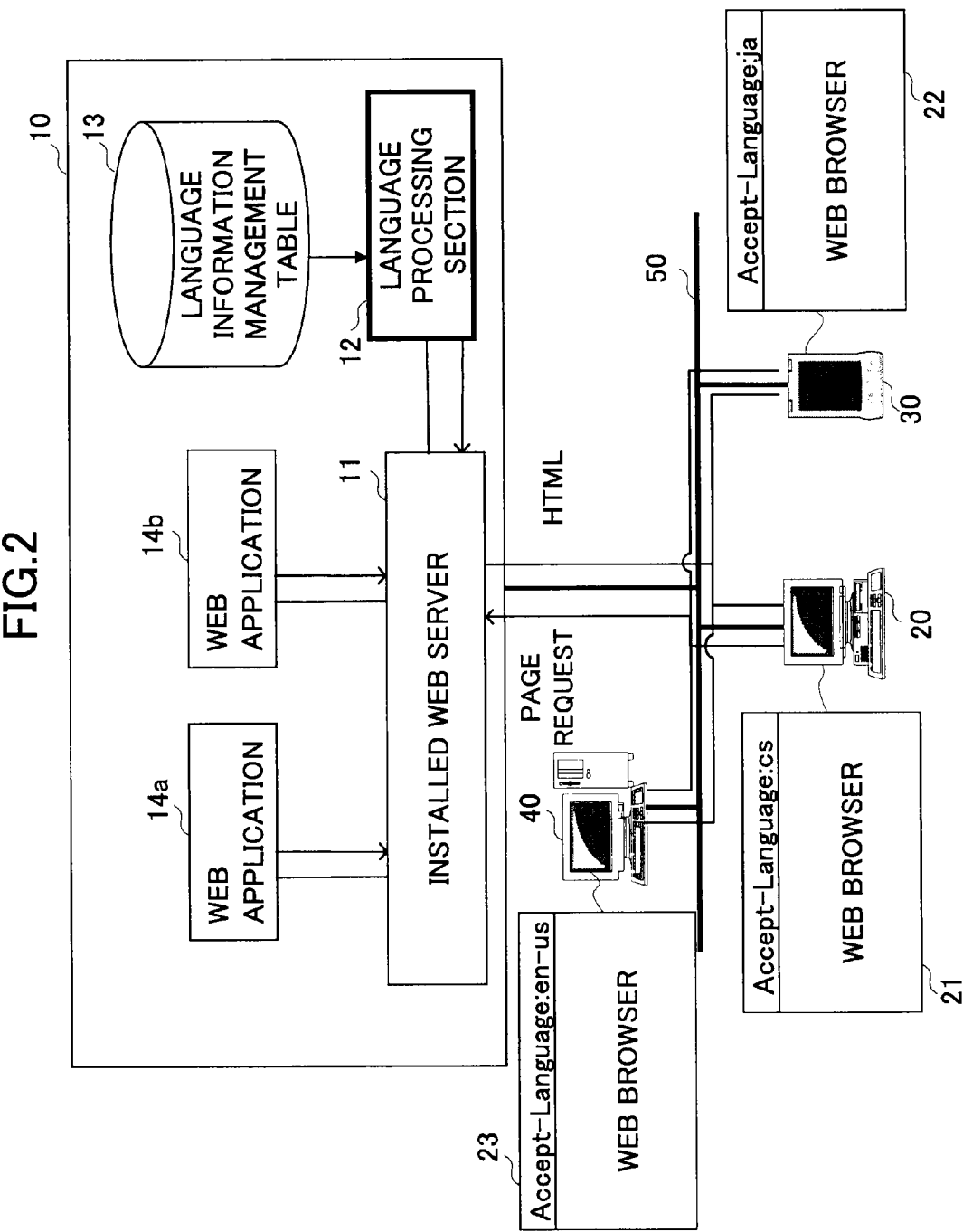
FIG. 2 is a diagram showing an example of a functional structure of the image processing apparatus as a Web server.

A description will now be given, with reference to FIG. 2, of a function as a Web server of the image forming apparatus 10, which is achieved by the above-mentioned Web application 1014 and network service 1017. FIG. 2 is a diagram showing an example of a functional structure of the image processing apparatus as a Web server. The image processing apparatus 10 shown in FIG. 2 comprises an incorporative Web server 11, a language processing section 12, a language information management table 13, a Web application 14, a Web application 14b, etc. The image processing apparatus 10 is connected with terminals 20, 30 and 40 through the network 50 such as a local area network (LAN), an intranet or the Internet.

The incorporative Web server 11 corresponds to a program generally referred to as HTTPd (HTTP daemon) for causing the image processing apparatus 10 to serve as a Web server. Upon receipt of a send request (HTTP request) of a Web page sent from the terminal 20, etc., the Web server 11 inquires the language processing section 12 of a language (a natural language: hereinafter, referred to as a "display language") used for producing a Web page that provides predetermined information. Then, the Web server 11 sends a request to the Web application 14a to produce a Web page described in the display language notified by the language processing section 12. Furthermore, the incorporative Web server 11 sends, as an HTTP request, the Web page of HTML format produced by the Web application 14a to the terminal 20. It should be noted that the incorporative Web server 11 is mounted as a part of the function of the network service 1017 in FIG. 1.

The language processing section 12 is a module for judging the display language suitable for the terminal 20 to which the send request of the Web page was sent. The language processing section 12 judges a desired display language with reference to the language information management table 13. The language information management table 13 manages information regarding (available) display languages supported by the image processing apparatus 10 and also information regarding a language (hereinafter, referred to as an "operation panel language") currently used for the displayed object on the operation panel of the image processing apparatus 10.

Here, the operation panel is a panel provided in the image processing apparatus 10 for displaying operation information for operating an image processing apparatus 10 to the user of the image processing apparatus 10. Accordingly, the image processing apparatus 10 is capable of selecting the operation panel language from among a plurality of previously installed languages in accordance with the user's designation. Thus, if the user designates, for example, Japanese language as the operation panel language, the image processing apparatus 10 displays the operation information on the operation panel in Japanese. It should be noted, in the image processing apparatus 10 according to the preset embodiment, it is supposed that Japanese language and English language are supported, and Japanese language is selected as the operation panel language.

The Web application 14a and the Web application 14b (hereinafter, may be referred to as Web application 14 as a whole) perform a predetermined process to produce a web page, which displays information regarding the image processing apparatus 10, in the language (display language) notified by the incorporative Web server 11.

The terminals 20, 30 and 40 are a personal computer (PC), a personal digital (data) assistant (PDA) and a portable phone having Web browsers 21, 31 and 41, respectively. The users of the terminals 20, 30 and 40 can check the information on the image processing apparatus 10 through the respective web browsers 21, 31 and 41.

In a general Web browser, it is possible to set up a use language. The language set in a Web browser is specified as a value of the "Accept-Language field" included in a request header of the HTTP request when sending the HTTP request to the Web server. For example, the value of the Accept-Language field is set to "ja" if Japanese language is set as the use language of a web browser, the value of the Accept-Language field is set to "en-us" if American English is set as the use language, and the value of the Accept-Language field is set to "cs" if Czechoslovak language is set as the use language. In the present embodiment, it is assumed that Czechoslovak language is set in the web browser 21, Japanese language is set in the web browser 22 and American English language is set in the Web browser 23. That is, it is assumed that the user of the terminal 20 is a Czechoslovak, the user of the terminal 30 is Japanese and the user of the terminal 40 is American. Additionally it is assumed that the image processing apparatus 10 and the terminals 20, 30 and 40 are located on the same floor of an Office building in Japan.

Figure 3:
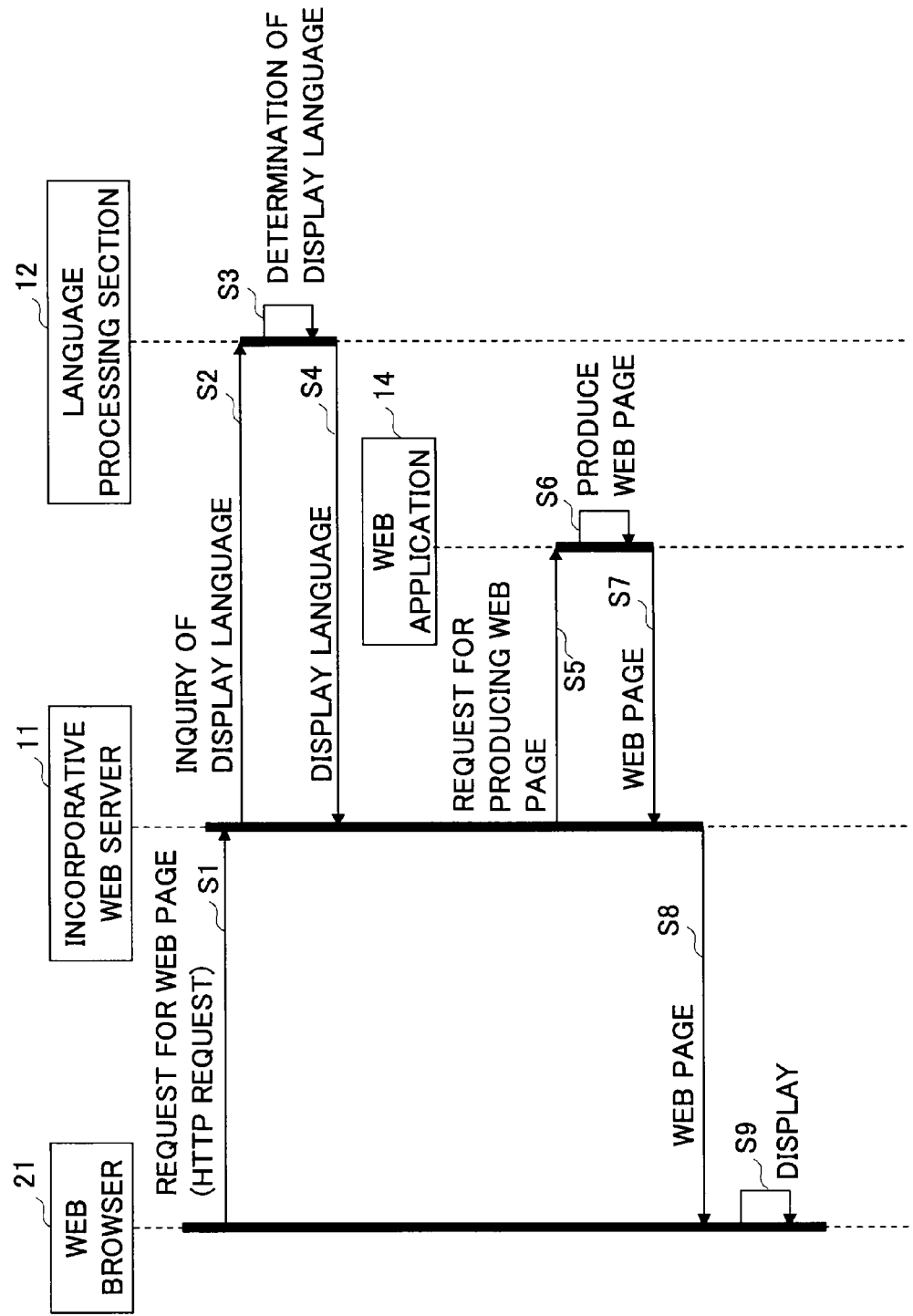
FIG. 3 is a sequence diagram for explaining an outline of a process performed in the image processing apparatus shown in FIG. 2.

A description will now be given, with reference to FIG. 3, of a process procedure performed by the image processing apparatus 10 shown in FIG. 2. FIG. 3 is a sequence diagram for explaining an outline of the process performed in the image processing apparatus 10.

In step S1, when the Czechoslovakia user of the terminal 20 inputs an IP address or URL of the image processing apparatus 10 into the web browser 21 so as to check information on the image processing apparatus 10, the Web browser 21 sends the HTTP request, which requires transmission of a Web page, to the image processing apparatus 10. Here, the value of the Accept-Language field included in the request header of the HTTP request to be sent is set to "cs".

Following step S1, the routine proceeds to step S2 where the incorporative Web server 11 of the image processing apparatus 10, which received the HTTP request from the Web browser 21, inquires the language processing section 12 about the display language. Following step S2, the routine proceeds to step S3 where the language processing section 12 performs a predetermined process mentioned later so as to determine the display language. Then, the language processing section 12 outputs a character string for discriminating the determined display language (for example, Japanese language if Japanese language is set as the display language) to the Web server 11.

As mentioned above, the user of the terminal 21 uses Czechoslovakia language. However, the languages supported in the image processing apparatus 10 are Japanese language and English language. Thus, in the present embodiment, the language processing section 12 determines a language, which has a high-possibility that the user of the terminal 20 can understand, as the display language by performing a process mentioned later.

Following step S4, the routine proceeds to step S5 where the incorporative Web server 11 calls the Web application 14, which corresponds to the URL designated in the HTTP request. It should be noted that when calling the Web application 14, incorporative Web server 11 notifies the Web application 14 of the display language.

Following step S5, the routine proceeds to step S6 where the Web application 14 performs the predetermined process so as to produce Web pages with a HTML format. For example, if the Web application 14 is to produce the Web page that displays the status information of the image processing apparatus 10, the Web application 14 acquires the status information of the image processing apparatus 10 through the API so as to produce the Web page which displays the acquired information in the display language. Accordingly, if the display language is Japanese, the Web application 14 produces the Web page displayed in Japanese.

Following step S6, the routine proceeds to step S7 where the Web application 14 outputs the produced Web page to the incorporative Web server 11. Then, the Web server 11 sends, in step S8, the Web page to the browser 21.

Following step S8, the routine proceeds to step S9 where the Web browser 21 displays the received Web page. It should be noted that the display of Web page is not in Czechoslovakia language but in Japanese or English. However, since the language processing section 12 determines the language, which has high possibility that the user of the terminal 20 can understand, as the display language, it is highly possible that the Czechoslovakia user of the terminal 20 can understand the contents of the Web page by viewing the Web page.

Figure 4:
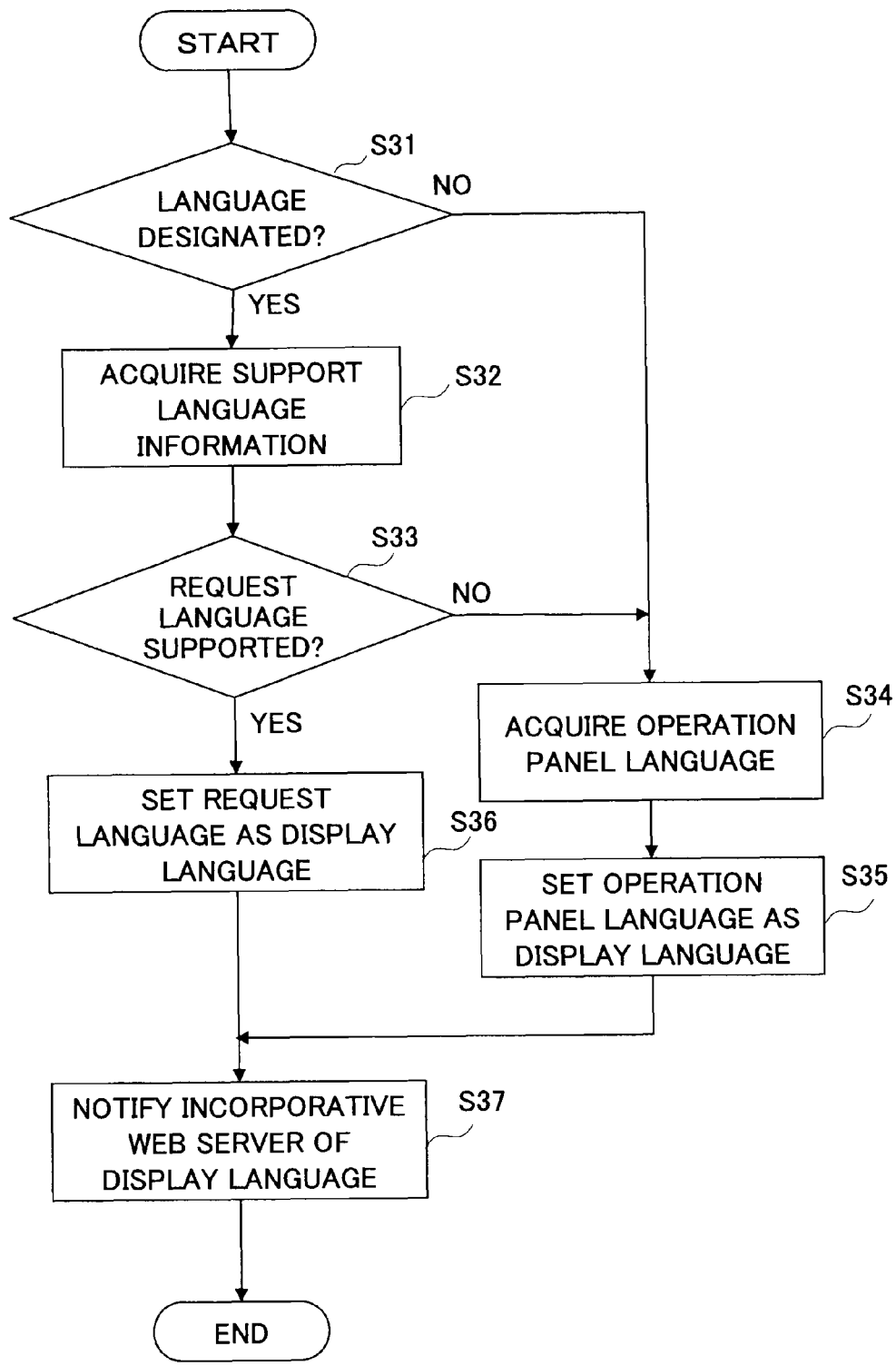
FIG. 4 is a flowchart of a determination process for a display language performed by a language processing section shown in FIG. 2.

A description will now be given, with reference to FIG. 4, of the process of step S3 in detail. FIG. 4 is a flowchart of a process for determining the display language performed by the language processing section 12.

In step S31, the language processing section 12 determines whether a value is set in the Accept-Language field notified by the incorporative Web server 11. It is because the Accept-Language field may not be provided in the request header depending on a mounted state of a Web browser. If the Accept-Language field is set up, the routine proceeds to step S32. On the other hand, if the Accept-Language field is not set up, the routine proceeds to step S34. In this case, "cs" (Czechoslovak language) is set up, and, thus, the routine proceeds to step S32.

In step S32, the language processing section 12 acquires a list of languages, which the image processing apparatus 10 is supporting, from the language information management table 13.

Figure 5:
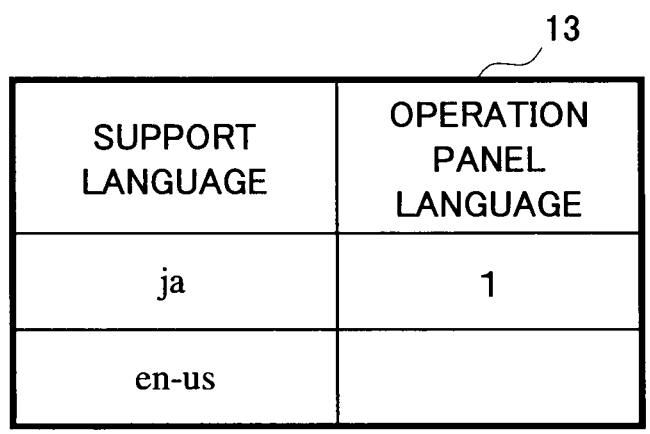
FIG. 5 is an illustration for explaining a language information management table.

FIG. 5 is an illustration showing an example of a structure of the language information management table. The language information management table 13 shown in FIG. 5 has a "support language" column and an "operation panel language" column as data items, and one record is registered for each supported language. Discrimination information of the languages supported by the image processing apparatus 10 is registered in the "support language" column. The "operation panel language" column is an item, which indicates whether each support language is used as the operation panel language. That is, when a support language is used as the operation panel language, "1" is registered in relation to the support language concerned. It is appreciated from FIG. 5 that the image processing apparatus 10 is supporting two languages (Japanese and English) that are discriminated by "ja" and "en-us", and Japanese is selected as the operation panel language. Therefore, the language processing section 12 acquires two languages, "ja" and "en-us", as the support language from the language information management table 13.

Following step S33, the routine proceeds to step S32 where the language processing section 12 determines whether or not there is any language, which matches the language (hereinafter, referred to as a "request language") specified in the Accept-Language field, among the support languages. If there is a language that matches the request language among the support languages, the routine proceeds to step S36. On the other hand, if there is no language that matches the request language among the support languages, the routine proceeds to step S34. In this case, the request language is "cs" and the support languages are "ja" and "en-us", and, thus, the request language corresponds to neither of the support languages. Accordingly, the routine proceeds to step S34. It should be noted that if a plurality of languages are specified in the Accept-Language fields, the language processing section 12 determines whether or not there is any language which matches the support language with respect to all languages specified in the Acceptance-Language field.

In step S34, the language processing section 12 determines the operation panel language based on information in the "operation panel language" column of the language information management table 13. Since the operation panel language is "ja" as shown in FIG. 5, the language processing section 12 determines that the language (Japanese) discriminated by "ja" is the operation panel language. Following step S34, the routine proceeds to step S35 where the language processing section 12 determines the operation panel language as the display language, and outputs a value of "ja" to the incorporative Web server 11.

It should be noted that if the request language is included in the support languages (in the case of Yes of S33), that is, when an HTTP request is received from the Web browser 21 or the Web browser, the language processing section 12 determines, in step S36, the request language as the display language as it is, and outputs discrimination information of the display language to the incorporative Web server 11.

As mentioned above, the image processing apparatus 10 according to the present embodiment produces a Web page using an operation panel as a display language when there is no designation of the request language made by a remote terminal or when the language designated as the request language is not supported in the image processing apparatus 10. Therefore, the Web page described in the operation panel is displayed on the remote terminal.

In a Web server that exhibits information all over the world, it cannot narrow down languages, which users use, since the users accessing the Web server are located all over the world. However, in the Web site provided by an incorporative device such as the image processing apparatus 10, users who accesses are limited to a quite narrow range.

For example, if the image processing apparatus 10 is located on a floor of an office, persons who want to access the image processing apparatus 10 are limited to persons on that floor. That is, they are persons who actually operate the image processing apparatus 10 using the operation panel. Moreover, persons working in a place limited to some extent should communicate normally by a common language. For example, as in the office in Japan as in the present embodiment, the users of the terminals 20, 30 and 40 should communicate with each other using Japanese language.

Thus, the language (operation panel language) displayed on the operation panel of the image processing apparatus 10 should be set to the language which the persons on the floor can commonly understand. That is, it is highly possible that the Czechoslovak user of the terminal 20 understands the operation panel language, and it is possible very much that the Czechoslovak user of the terminal 20 can access the Web page provided by the image processing apparatus 10 and understand the contents of the Web page.

Therefore, it can be said that the image processing apparatus 10 according to the present embodiment has validity very much and makes a rational judgment in providing a Web page according to a language suitable for users within a range of the support languages. The users can access the Web page provided by the image processing apparatus in the language, which each user can understand.

It should be noted that although the image processing apparatus is explained as an example of the information service apparatus in the present embodiment, the present invention is applicable to other apparatuses that serve as a Web server.

The present invention is not limited to the specifically disclosed embodiments, and variations and modifications may be made without departing from the scope of the present invention.

What is claimed is:

1. An apparatus comprising:
a processor;
a display unit;
a setting unit configured to configured to set a first language from among a plurality of languages, the first language being used to display first information on said display unit;
a communication interface configured to receive, from an external device, a request for providing second information;
a judging, in conjunction with the processor, configured to judge whether the second information can be provided in a second language indicated by the request; and
a controlling unit, in conjunction with the processor, configured to control the communication interface to provide the second information in the second language to the external device when the judging unit judges that the second information can be provided in the second language, and control the communication interface to provide the second information in the first language set by the setting unit to the external device when the judging unit judges that the second information can not be provided in the second language.

2. The apparatus of claim 1, further comprising:
a user interface that receives an input selecting the first language from among the plurality of languages, wherein the display displays the first information in the first language based on the received input.

3. The apparatus of claim 1, wherein the first information is operation information for operating the apparatus.

4. The apparatus of claim 1, wherein the controlling unit generates the second information in the second language when the judging unit judges that the second information can be provided in the second language, generates the second information in the first language when the judging unit judges that the second information can not be provided in the second language, and controls the communication interface to provide the generated second information.

5. The apparatus of claim 1, wherein
the communication interface receives requests for providing the second information from each of a plurality of external devices, and
the control unit controls the communication interface to provide the second information to one of the external devices.

6. A non-transitory computer-readable medium including computer program instructions, which when executed by an apparatus including a display that displays first information in a first language that is selected and set from among a plurality of languages, and a communication interface that receives, from an external device, a request for providing second information, causes the apparatus to perform a method comprising:
judging whether the second information can be provided in a second language indicated by the request; and
providing the second information in the second language to the external device when the judging judges that the second information can be provided in the second language, and providing the second information in the first language, which is currently set for displaying the first information at the display, to the external device when the judging judges that the second information can not be provided in the second language.

7. An apparatus comprising:
a display that displays first information in a first language that is selected and set from among a plurality of languages;
a communication interface that receives, from an external device, a request for providing second information; and
a processor that
judges whether the second information can be provided in a second language indicated by the request; and
controls the communication interface to provide the second information in the second language to the external device when the judging judges that the second information can be provided in the second language, and controls the communication interface to provide the second information in the first language, which is currently set for displaying the first information at the display, to the external device when the judging judges that the second information can not be provided in the second language.

* * * * *